United States Patent
Liang et al.

(10) Patent No.: US 12,288,373 B2
(45) Date of Patent: Apr. 29, 2025

(54) METHOD OF PROCESSING IMAGE, ELECTRONIC DEVICE, STORAGE MEDIUM, AND PROGRAM PRODUCT

(71) Applicant: KUNLUNXIN TECHNOLOGY (BEIJING) COMPANY LIMITED, Beijing (CN)

(72) Inventors: Zihao Liang, Beijing (CN); Jian Ouyang, Beijing (CN); Wei Qi, Beijing (CN); Jing Wang, Beijing (CN)

(73) Assignee: KUNLUNXIN TECHNOLOGY (BEIJING) COMPANY LIMITED, Beijing (CN)

( * ) Notice: Subject to any disclaimer, the term of this patent is extended or adjusted under 35 U.S.C. 154(b) by 366 days.

(21) Appl. No.: 17/882,738

(22) Filed: Aug. 8, 2022

(65) Prior Publication Data
US 2022/0383611 A1  Dec. 1, 2022

(30) Foreign Application Priority Data

Sep. 30, 2021  (CN) .......................... 202111161724.0

(51) Int. Cl.
*G06V 10/44* (2022.01)
*G06T 3/4038* (2024.01)

(52) U.S. Cl.
CPC ............ *G06V 10/44* (2022.01); *G06T 3/4038* (2013.01)

(58) Field of Classification Search
CPC ........ G06V 10/44; G06V 10/94; G06V 10/82; G06T 3/4038; G06T 5/50; G06T 2200/32; G06T 2207/20081; G06T 2207/20084; G06N 3/08; G06N 3/045
See application file for complete search history.

(56) References Cited

U.S. PATENT DOCUMENTS

| | | | |
|---|---|---|---|
| 12,094,182 B2 * | 9/2024 | Georgescu | G16H 80/00 |
| 2015/0086134 A1 | 3/2015 | Hameed et al. | |
| 2020/0302215 A1 | 9/2020 | Sombatsiri | |
| 2020/0349420 A1 * | 11/2020 | Ovsiannikov | G06N 3/045 |

(Continued)

FOREIGN PATENT DOCUMENTS

| | | |
|---|---|---|
| CN | 108681984 A | 10/2018 |
| CN | 110555802 A | 12/2019 |

(Continued)

OTHER PUBLICATIONS

Official Communication issued in corresponding Chinese Patent Application No. 202111161724.0, mailed on Dec. 23, 2024, 7 pages.

(Continued)

*Primary Examiner* — Nizar N Sivji
(74) *Attorney, Agent, or Firm* — Keating & Bennett, LLP

(57) ABSTRACT

The present disclosure provides a method of processing an image, an electronic device, and a storage medium, which may be used in a field of artificial intelligence, especially in a field of image processing, etc. The method includes: acquiring an input image containing a plurality of rows of pixels; performing, by using a plurality of dedicated processing units, a pixel extraction in parallel on each row of pixels of the plurality of rows of pixels in the input image, so as to obtain row data for each row of pixels; and stitching the row data for each row of pixels, so as to obtain an output image.

12 Claims, 11 Drawing Sheets

(56) References Cited

U.S. PATENT DOCUMENTS

| | | | | |
|---|---|---|---|---|
| 2020/0349672 A1* | 11/2020 | Cochran | ............ | H04N 21/2402 |
| 2021/0037168 A1* | 2/2021 | Mathur | ................... | H04L 65/61 |
| 2022/0084660 A1* | 3/2022 | Georgescu | ............. | G16H 30/40 |
| 2022/0350514 A1* | 11/2022 | Dazzi | ........................ | G06T 1/60 |
| 2024/0160689 A1* | 5/2024 | Sun | ......................... | G06F 15/78 |

FOREIGN PATENT DOCUMENTS

| | | | | |
|---|---|---|---|---|
| WO | WO-2019109795 A1 * | 6/2019 | ............. | G06F 17/15 |
| WO | WO-2024027039 A1 * | 2/2024 | ........... | G06F 17/153 |

OTHER PUBLICATIONS

Gao et al., "A Deep Learning Frame on Embedded Multicore Processors Based on Caffe and Its Parallel Implementation", Journal of Xi an Jiaotong Univeristy vol. 52 No. 6, Jun. 2018, 7 pages.

Zhao, "Research on special heterogeneous accelerator of convolutional neural network based on FPGA", Shandong Univeristy, Thesis for Master Degree, Jun. 3, 2020, 85 pages.

Bose et al., "Fully Embedding Fast Convolutional Networks on Pixel Processor Arrays", Computer Vision—ECCV 2020, Oct. 2020, pp. 1-16.

\* cited by examiner

|  | | | | | | |
|---|---|---|---|---|---|---|
| r0s0 | pad | 1 | 3 | pad | 6 | 8 |
| r0s1 | 0 | 2 | 4 | 5 | 7 | 9 |
| r0s2 | 1 | 3 | pad | 6 | 8 | pad |
| r1s0 | pad | 6 | 8 | pad | 11 | 13 |
| r1s1 | 5 | 7 | 9 | 10 | 12 | 14 |
| r1s2 | 6 | 8 | pad | 11 | 13 | pad |

METHOD OF PROCESSING IMAGE, ELECTRONIC DEVICE, STORAGE MEDIUM, AND PROGRAM PRODUCT

CROSS-REFERENCE TO RELATED APPLICATION(S)

This application claims the priority of Chinese Patent Application No. 202111161724.0, filed on Sep. 30, 2021, the entire contents of which are hereby incorporated by reference.

TECHNICAL FIELD

The present disclosure relates to a computer technology, in particular to a method of processing an image, an electronic device, a computer-readable storage medium and a computer program product, which may be used in a field of artificial intelligence, especially in a field of image processing, etc.

BACKGROUND

Nowadays, deep learning has been widely used. With a diversification of models and an increase in computing power requirements, considering a performance and cost of an original deep learning hardware platform such as a general-purpose processor and a graphics processing unit, the industry has begun to self-develop a deep learning accelerator.

SUMMARY

According to the embodiments of the present disclosure, there is provided a method of processing an image, an electronic device, a computer-readable storage medium and a computer program product.

In a first aspect of the present disclosure, there is provided a method of processing an image, including: acquiring an input image containing a plurality of rows of pixels; performing, by using a plurality of dedicated processing units, a pixel extraction in parallel on each row of pixels of the plurality of rows of pixels in the input image, so as to obtain row data for each row of pixels; and stitching the row data for each row of pixels, so as to obtain an output image.

In a second aspect of the present disclosure, there is provided an electronic device, including: at least one processor; and a memory communicatively connected to the at least one processor, wherein the memory stores instructions executable by the at least one processor, and the instructions, when executed by the at least one processor, cause the at least one processor to implement the method according to the first aspect of the present disclosure.

In a third aspect of the present disclosure, there is provided a non-transitory computer-readable storage medium having computer instructions stored thereon, and the computer instructions allow a computer to implement the method according to the first aspect of the present disclosure.

It should be understood that content described in this section is not intended to identify key or important features in the embodiments of the present disclosure, nor is it intended to limit the scope of the present disclosure. Other features of the present disclosure will be easily understood through the following description.

BRIEF DESCRIPTION OF THE DRAWINGS

By describing the exemplary embodiments of the present disclosure in more detail in combination with the accompanying drawings, the above and other objectives, features and advantages of the present disclosure will become more obvious. In the exemplary embodiments of the present disclosure, the same reference numerals usually represent the same components. It should be understood that the accompanying drawings are used to understand the solution better and do not constitute a limitation to the present disclosure.

In the accompany drawings, the same or corresponding reference numerals represent the same or corresponding elements.

DETAILED DESCRIPTION OF EMBODIMENTS

Figure 1:
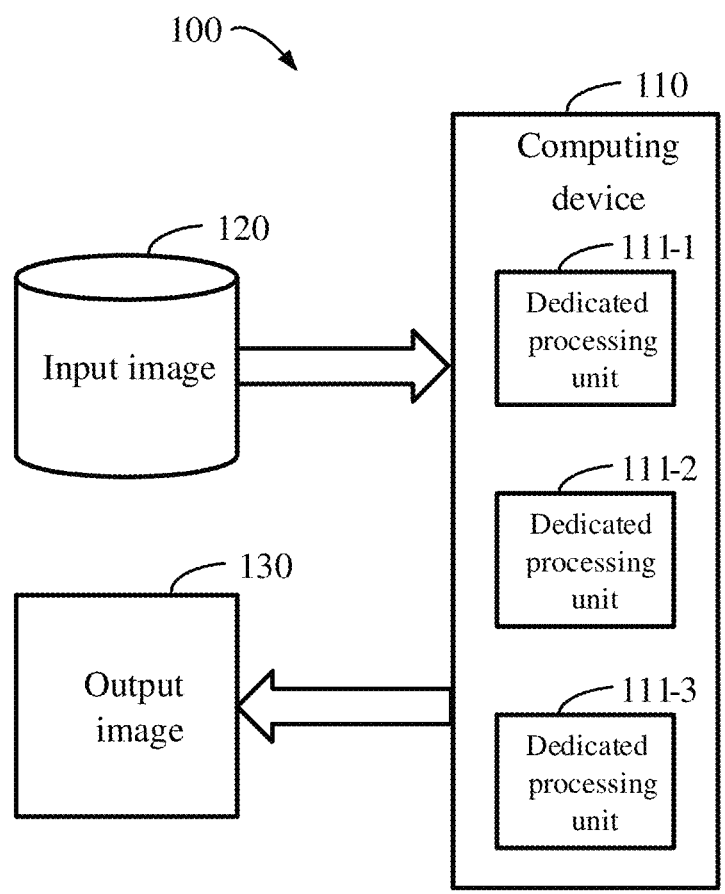
FIG. 1 shows a schematic block diagram of an image processing environment 100 in which a method of processing an image in some embodiments of the present disclosure may be implemented.

Hereinafter, preferred embodiments of the present disclosure will be described in more detail with reference to the accompanying drawings. Although the exemplary embodiments of the present disclosure are shown in the accompany drawings, it should be understood that the present disclosure may be implemented in various forms and should not be limited by the embodiments described herein. On the contrary, these embodiments are provided to enable a more thorough understanding of the present disclosure and to fully convey the scope of the present disclosure to those skilled in the art.

The term "including" and its variants as used herein means open-ended inclusion, that is, "including but not limited to". Unless otherwise specified, the term "or" means "and/or". The term "based on" means "at least partially based on." The terms "an exemplary embodiment" and "an embodiment" mean "at least one exemplary embodiment." The term "another embodiment" means "at least one other embodiment." The terms "first," "second," and the like may refer to different or the same object. The following may further include other explicit and implicit definitions.

A convolution layer is a very common layer in a neural network. In a forward calculation of the convolution layer, several convolution kernels are needed to perform a convolution operation on an input image. A common implementation method is to perform im2col operation on the input image, so that the convolution operation may be converted into a matrix multiplication. In a training process, a reverse calculation is further required, in which a weight gradient and an input image gradient of the current layer need to be calculated according to an output image gradient of the current layer and propagated to a previous layer in turn. The weight gradient is solved by multiplying the output image gradient by the input image after the im2col operation. In order to obtain a high throughput in a hardware calculation, the dimension needs to be sorted into continuous data and output to a matrix operation unit, which is equivalent to performing im2col operation and transpose operation.

However, the technology for pixel extraction has a low technical efficiency and is difficult to meet the needs of users.

For example, a convolution layer is a very common layer in a neural network. In a forward calculation of the convolution layer, several convolution kernels are used to perform a convolution operation on an input image. In a CHW format, it is assumed that a size of an image $c*in\_h*in\_w$, a size of the convolution kernels, which may also be called a weight, is $f*c*r*s$, and a size of an output image obtain by the convolution operation is $f*out\_h*out\_w$, where c represents a number of channels of the input image, in_h represents a height of the input image, in_w represents a width of the input image, f represents a number of the convolution kernels, r represents a height of the convolution kernels, s represents a width of the convolution kernels, out_h represents a height of the output image, and out_w represents a width of the output image. A unit of these heights and widths may be a pixel.

A common implementation method is to perform im2col operation on the input image, so that a part processed by the convolution kernel is expanded into $out\_h*out\_w$ one-dimensional vectors each having a length of $c*r*s$, that is, converted into [$out\_h*out\_w$, $c*r*s$]. Then, the convolution operation may be converted into a matrix multiplication, and a specific size of matrix multiplication is [f, $c*r*s$]·[$c*r*s$, $out\_h*out\_w$]=[f, $out\_h*out\_w$].

In a training process, a reverse calculation is further required, in which a weight gradient and an input image gradient of the current layer need to be calculated according to an output image gradient of the current layer and propagated to a previous layer in turn. The weight gradient is solved by multiplying the output image gradient by the input image obtained by the im2col operation. A specific size is [f, $out\_h*out\_w$]·[$out\_h*out\_w$, $c*r*s$]=[f, $c*r*s$], where $out\_w*out\_h$ is a multiply-accumulated dimension.

During a calculation by using a hardware, in order to obtain a high throughput, the multiply-accumulated dimension needs to be sorted into continuous data and output to a matrix operation unit. The output image gradient is [f, $out\_h*out\_w$] and an additional processing is not required, while the input image needs to be processed from [c, $in\_h*in\_w$] to [$c*r*s$, $out\_h*out\_w$], which is equivalent to performing the im2col operation and the transpose operation. Therefore, an improvement of a processing efficiency is of great significance for the weight gradient calculation.

In the technology, two solutions are generally used to solve the weight gradient calculation in the reverse calculation in deep learning. In one solution, a general-purpose processor is used to execute general-purpose instructions by using a register file and a general-purpose computing unit, so as to perform the reverse calculation in deep learning. In the other solution, a dedicated processing unit using a graphics processing unit is used to execute single-instruction multiple-data (SIMD) instructions by using a register file and a stream processing unit, so as to perform the reverse calculation in deep learning.

However, both the solutions have serious deficiencies.

The first solution may be implemented relatively simply, but the general-purpose processor is suitable for a scalar computing, and exhibits a lack of computing power in deep learning-related computing and has a low overall performance.

The second solution still lacks specific implementation details.

The embodiments of the present disclosure propose a method of processing an image. With a technical solution of the present disclosure, a processing of input images in various sizes may be flexibly supported and a pixel extraction may be performed efficiently by taking full advantage of parallelism of hardware, so that an efficient weight gradient calculation may be supported, a throughput of an overall computing process may be improved, and thus a user experience may be improved.

FIG. 1 shows a schematic block diagram of an image processing environment 100 in which a method of processing an image in some embodiments of the present disclosure may be implemented. According to one or more embodiments of the present disclosure, the image processing environment 100 may be a cloud environment.

As shown in FIG. 1, the image processing environment 100 includes a computing device 110, and the computing device 110 includes a dedicated processing unit 111-1, a dedicated processing unit 111-2 and a dedicated processing unit 111-3, which may be collectively referred to as a dedicated processing unit 111. It should be understood that three dedicated processing units 111 are shown in FIG. 1 for example only, and more or fewer dedicated processing units 111 may be included in the image processing environment 100 according to different functions and user needs. According to one or more embodiments of the present disclosure, the dedicated processing unit 111 may be, for example, a dedicated processing unit such as a graphics processing unit, or a processing core in the aforementioned dedicated processing unit.

In the image processing environment 100, the computing device 110 may acquire an input image 120. According to one or more embodiments of the present disclosure, the input image 120 may be an input image 120 in CHW format, and an image size of the input image 120 may be $c*in\_h*in\_w$. Therefore, the input image 120 may contain a plurality of channels, and each channel includes in_w rows of pixels.

According to one or more embodiments of the present disclosure, the input image 120 in CHW format is continuous in a width dimension that may be called a row dimension, and an order of storage is such that all pixels in a row is firstly stored, then data associated with a height dimension that may be called a column dimension is stored, and finally data associated with the channel is stored. For example, if the input image 120 is an RGB image file, an entire image in an R channel is firstly stored, then an entire image in a G channel is stored, and an entire image in a B channel is finally stored.

When acquiring the input image 120, the computing device 110 may perform, by using the dedicated processing unit 111 in the computing device 110, a pixel extraction in parallel on each row of pixels of the in-w rows of pixels in each channel in the input image 120, so as to obtain row data for each row of pixels. Then, the computing device 110 may stitch the row data for each row of pixels by using the dedicated processing unit 111 in the computing device 110, so as to obtain an output image 130.

It should be understood that the image processing environment 100 is merely exemplary and not restrictive, and it is scalable. More computing devices 110 may be included, the computing device 110 may acquire more input images 120, and more dedicated processing units 111 may be used for the input images 120, so that more users may perform the pixel extraction in parallel with more computing devices 110 to obtain more output images 130. Therefore, it is possible to meet the needs of users to process more input images 120 simultaneously or non-simultaneously to obtain more output images 130 by using more computing devices 110 and dedicated processing units 111 in the computing devices.

In the image processing environment 100 shown in FIG. 1, a process of the computing device 110 acquiring the input image 120 and providing the output image 130 may be carried out through a network.

Figure 2:
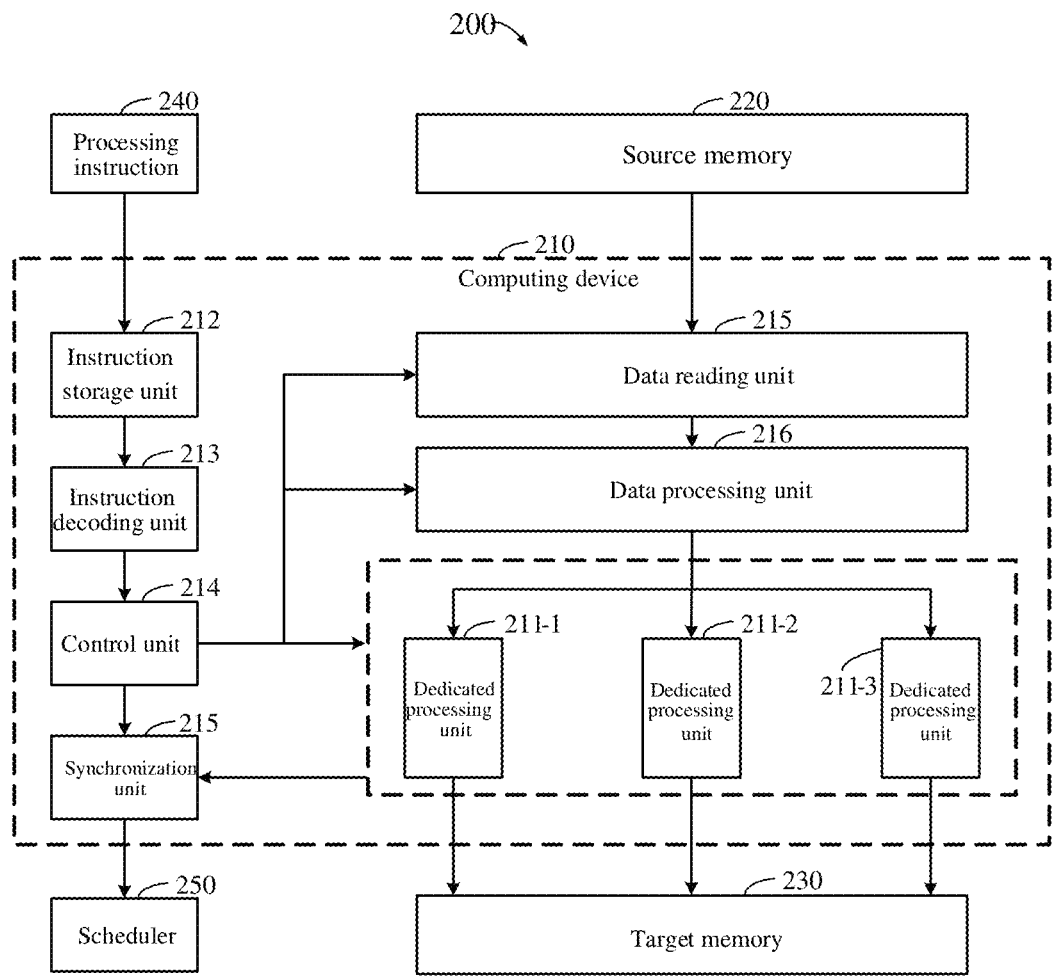
FIG. 2 shows a schematic block diagram of an image processing environment 200 in which a method of processing an image in some embodiments of the present disclosure may be implemented.

FIG. 2 shows a schematic block diagram of an image processing environment 200 in which a method of processing an image in some embodiments of the present disclosure may be implemented. According to one or more embodiments of the present disclosure, the image processing environment 200 may be a cloud environment.

As shown in FIG. 2, the image processing environment 200 includes a computing device 210, and the computing device 210 includes a dedicated processing unit 211-1, a dedicated processing unit 211-2 and a dedicated processing unit 211-3, which may be collectively referred to as a dedicated processing unit 211. It should be understood that three dedicated processing units 211 are shown in FIG. 2 for example only, and more or fewer dedicated processing units 211 may be included in the image processing environment 200 according to different functions and user needs. According to one or more embodiments of the present disclosure, the dedicated processing unit 111 may be, for example, a graphics processing unit.

In addition to the dedicated processing unit 211, the computing device 210 further includes an instruction storage unit 212, an instruction decoding unit 213, a control unit 214, a synchronization unit 215, a data reading unit 216 and a data processing unit 217.

The image processing environment 200 may further include a source memory 220 from which the computing device 210 may acquire the input image 120, a target memory 230 to which the computing device 210 may store the output image 130, a processing instruction 240 that may be input to the computing device 210 to perform various operations, and a scheduler 250 that may schedule various operations performed by the computing device 210. According to one or more embodiments of the present disclosure, the input image 120 may be the input image 120 in CHW format as described with reference to FIG. 1.

According to one or more embodiments of the present disclosure, the source memory 220 and the target memory 230 may be various types of memory, such as static random access memory (SRAM). In addition, the source memory 220 and the target memory 230 may also be combined into one memory.

The instruction storage unit 212 is used to store the acquired processing instruction 240. For a data conversion, the processing instruction 240 includes but is not limited to a parameter configuration instruction, a data operation instruction, a synchronization instruction, etc. The parameter configuration instruction is used to configure a parameter that includes but is not limited to a data type, a size of the input image, a size of the convolution kernel or weight, a convolution stride, a padding size, a memory address and an offset, etc. The data operation instruction is used to initiate a subsequent hardware execution action. The synchronization instruction is used to ensure that all instructions previous to the synchronization instruction are executed and data is placed on disk for a scheduler to synchronize each module.

When detecting that the instruction storage unit 212 is not empty and the instruction is currently executable, the instruction decoding unit 213 may read a processing instruction from the instruction storage unit 212 and parse the processing instruction, and transmit a parsed content to the control unit 214.

The control unit 214 may generate a corresponding control signal according to the configuration parameter. The control signal may be used to control a read request operation of the data reading unit 216, an operation of the data processing unit 217 and the dedicated processing unit 211, and an operation of the synchronization unit 215.

The data reading unit 216 may transmit a read request to the source memory 220 according to the control signal from the control unit 214. According to the control signal from the control unit 214, the data reading unit 216 may initiate multiple read requests to the source memory 220.

The data processing unit 217 and the dedicated processing unit 211 may perform a specific operation on the read data according to the control signal from the control unit 214. For example, a pixel extraction may be performed in parallel on each row of pixels of the in-w rows of pixels in each channel in the read input image 120.

When receiving a synchronization request, the synchronization unit 215 may output a synchronization completion signal to the scheduler 250 in response to detecting that the current instruction is executed completely and the data is placed on disk.

Specifically, according to one or more embodiments of the present disclosure, a specific operation flow of the computing device 210 may include the following. The processing instruction 240 including the configuration instruction, the data operation instruction and the synchronization instruction is acquired to the instruction storage unit 212, the instruction is decoded by the instruction decoding unit 213, and the control signal is output by the control unit 214 to subsequent modules such as the data reading unit 216, the data processing unit 217, the dedicated processing unit 211 and the synchronization unit 215 according to the parameter configuration. The data reading unit 216 initiates a continuous read operation on the source memory 220 in a specific manner according to the control signal. After the read data is returned, the data processing unit 216 performs a shift operation and a padding operation on the data according to the control signal. The dedicated processing unit 211 acquires data from the data processing unit 217, synchronously extracts and stitches a respective part of data according to the control signal, and finally writes the data to the target memory 230. When the dedicated processing unit 211 processes the data, different dedicated processing units 211 are configured to process different points of the convolution kernel, and in the entire process, the control unit 214 may perform several cycles until a cycle of all points of the entire convolution kernel is completed. After all data are placed on disk, the synchronization module 215 make a determination according to the control signal of the control unit 214 and the control signal returned by the dedicated processing unit 211, and feed an operation completion signal to the scheduler 250 to indicate that the data operation has been completed.

It should be understood that the image processing environment 200 is also merely exemplary and not restrictive, and it is scalable. In addition, in the image processing environment 200 shown in FIG. 2, a process of the computing device 210 acquiring the input image 120 from the source memory 220, providing the output image 130 to the target memory 230, acquiring the instruction 240 and interacting with the scheduler 250 may be carried out through a network.

Figure 3:
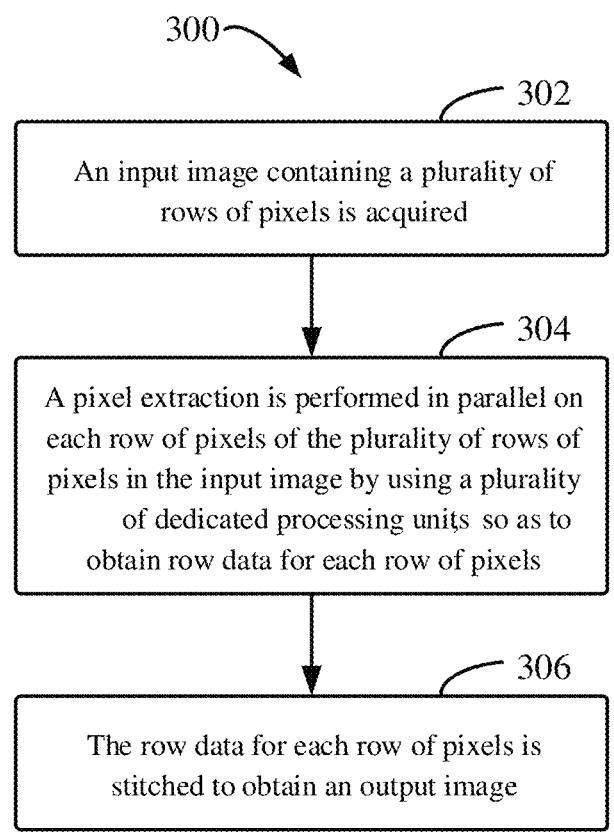
FIG. 3 shows a flowchart of a method 300 of processing an image according to the embodiments of the present disclosure.

FIG. 3 shows a flowchart of a method 300 of processing an image according to the embodiments of the present disclosure. Specifically, the method 300 of processing the image may be performed by the computing device 110 in the image processing environment 100 shown in FIG. 1 or performed by the computing device 210 in the image processing environment 200 shown in FIG. 2. It should be understood that the method 300 of processing the image may further include additional operations not shown and/or the operations shown may be omitted, and the scope of the present disclosure is not limited in this regard. Steps of the method 300 of processing the image are described below by taking the computing device 110 as an execution subject as an example.

In block 302, the computing device 110 acquires an input image. According to one or more embodiments of the present disclosure, the input image is an input image in CHW format and includes a plurality of rows of pixels.

A specific form of the input image is described below with reference to FIG. 4.

Figure 4:
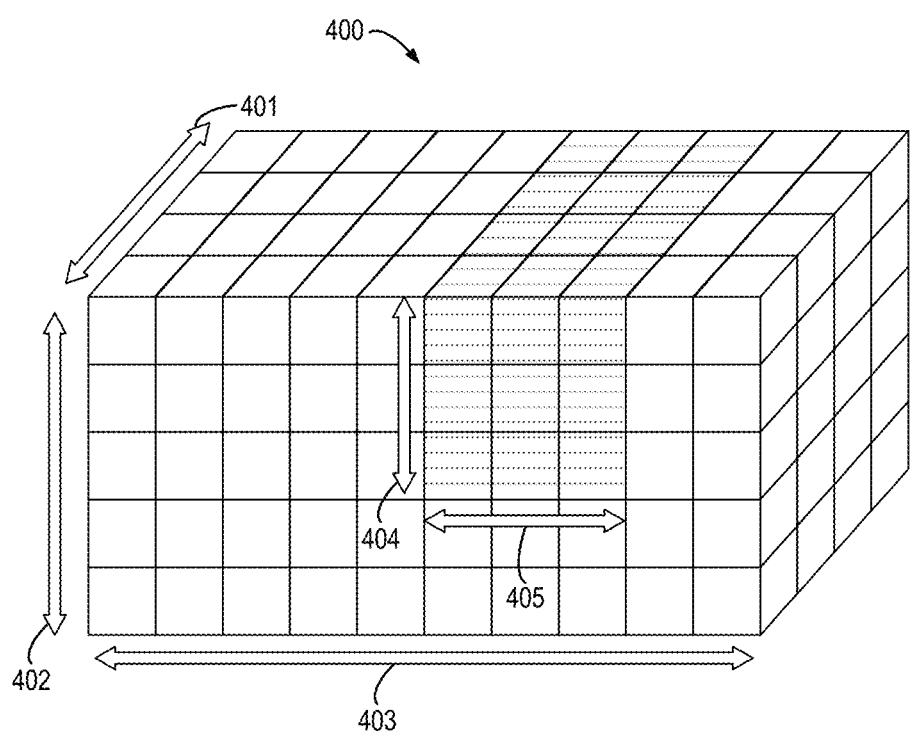
FIG. 4 shows a schematic diagram of an input image 400 according to the embodiments of the present disclosure.

FIG. 4 shows a schematic diagram of an input image 400 according to the embodiments of the present disclosure. As shown in FIG. 4, the input image 400 may be processed by a convolution kernel indicated by a horizontal shaded portion. A reference numeral 401 represents a channel number c of the input image 400 and also represents a channel number of the convolution kernel. Reference numerals 402 and 403 respectively represent a height in_h and a width in_w of the input image 400, which may also be considered as a column dimension and a row dimension of the input image 400, respectively. Reference numerals 404 and 405 respectively represent a height r and a width s of the convolution kernel. According to one or more embodiments of the present disclosure, a unit of the height in_h and the width in_w of the input image may be a pixel of the input image 400.

The channel number c of the input image 400 and the convolution kernel being 1 is firstly illustrated by way of example in describing the method 300.

In block 304, the computing device 110 performs a pixel extraction in parallel on each row of pixels of the plurality of rows of pixels in the input image by using a plurality of dedicated processing units 111, so as to obtain row data for each row of pixels.

In a forward calculation of the convolution layer, the convolution kernel may move by stride in a row direction and traverse an entire row, then return to the beginning of the row to move down by the stride, to traverse an entire row in the row direction, and repeatedly perform the above operation until an entire image is traversed. In an implementation method, data covered by a position of the convolution kernel each time the convolution kernel moves is successively extracted and expanded into a one-dimensional vector, that is, im2col operation is performed, with an expanded matrix size of [out_h*out_w, c*r*s]. Then, a matrix multiplication is performed on the data obtained by the im2col operation and the convolution kernel, and a size of the matrix multiplication is [f, c*r*s]·[c*r*s, out_h*out_w]=[f, out_h*out_w]. It should be noted that an accumulated dimension in the matrix multiplication formula is [c*r*s], and two matrices input to a matrix multiplication module generally are stored in rows storage and in columns respectively. Therefore, the data obtained by the im2col operation is performed actually does not need to be transposed.

In a backward weight gradient calculation, a matrix multiplication operation needs to be performed on an output data weight and the input data obtained by the im2col operation is performed, and a size is [f, out_h*out_w]· [out_h*out_w, c*r*s]=[f, c*r*s]. Since the accumulated dimension is [out_h*out_w], the input data needs to be sorted into [c*r*s, out_h*out_w] format, and a continuous storage of out_h*out_w dimension may ensure an efficient supply of data to the matrix multiplication unit.

According to one or more embodiments of the present disclosure, the computing device 110 may perform the pixel extraction in parallel using a plurality of dedicated processing units 111 to improve an efficiency of the pixel extraction in the aforementioned process.

According to one or more embodiments of the present disclosure, the computing device 110 may add a pad on an edge of at least one side of the input image, so as to obtain a padded input image. Depending on an algorithm used and the actual requirements, the above pad may be a pixel with a value of all 0 or all 1, or a value according to other preset rules, such as copying a value in the outermost pixel of the input image. In this case of adding the pad, the computing device 110 may perform the pixel extraction in parallel on each row of pixels of the plurality of rows of pixels in the padded input image by using a plurality of dedicated processing units 111, so as to obtain row data for each row of pixels.

In block 306, the computing device 110 stitches the row data for each row of pixels obtained in block 304, so as to obtain an output image. According to one or more embodiments of the present disclosure, the operation in block 306 may also be performed by the computing device 110 using the dedicated processing unit 111.

According to one or more embodiments of the present disclosure, as described above, the input image may contain a plurality of channels, and each channel may include a plurality of rows of pixels. In this case, in block 304, the computing device 110 may perform a pixel extraction in parallel on each row of pixels of the plurality of rows of pixels in each channel of the input image by using a plurality of dedicated processing units 111, so as to obtain row processing data for each row of pixels in the channel. Then, in block 306, the computing device 110 may stitch the row processing data for each row of pixels in the channel to obtain channel data for the channel, and stitch the channel data for each channel to obtain the output image.

The method 300 of processing the image according to the embodiments of the present disclosure is described above with reference to FIG. 3. According to one or more embodiments of the present disclosure, the method 300 of processing the image may also be expanded with additional steps, which will be described below with reference to FIG. 5.

Figure 5:
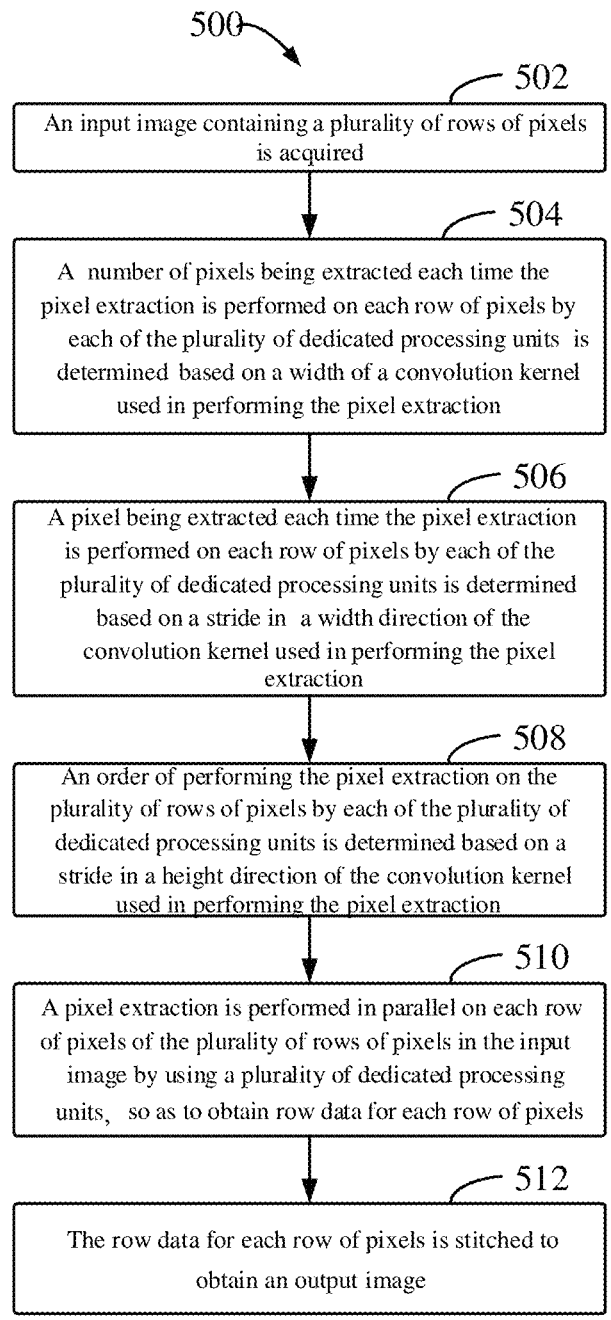
FIG. 5 shows a flowchart of a method 500 of processing an image according to the embodiments of the present disclosure.

FIG. 5 shows a flowchart of a method 500 of processing an image according to the embodiments of the present disclosure. Specifically, the method 500 of processing the image may be performed by the computing device 110 in the image processing environment 100 shown in FIG. 1 or the computing device 210 in the image processing environment 200 shown in FIG. 2. It should be understood that the method 500 of processing the image may further include additional operations not shown and/or the operations shown may be omitted, and the scope of the present disclosure is not limited in this regard. Steps of the method 500 of processing the image are described below by taking the computing device 110 as an execution subject as an example.

In block 502, the computing device 110 acquires an input image. According to one or more embodiments of the present disclosure, the input image is an input image in CHW format and includes a plurality of rows of pixels. A specific content of a step involved in block 502 is the same as that involved in block 302, which will not be repeated here.

In block 504, the computing device 110 determines, based on a width of a convolution kernel used in performing the pixel extraction, a number of pixels being extracted each time the pixel extraction is performed on each row of pixels by each of the plurality of dedicated processing units 111.

According to one or more embodiments of the present disclosure, the width of the convolution kernel used in performing the pixel extraction may be pre-configured according to an algorithm or user requirements, and the number of pixels being extracted each time the pixel extraction is performed on each row of pixels by each dedicated processing unit may be equal to the width of the convolution kernel. For example, if the width of the convolution kernel is 3, then three pixels may be extracted each time the pixel extraction is performed on each row of pixels by each dedicated processing unit.

In block 506, the computing device 110 determines, based on a stride in a width direction of the convolution kernel used in performing the pixel extraction, a pixel being extracted each time the pixel extraction is performed on each row of pixels by each of the plurality of dedicated processing units 111.

According to one or more embodiments of the present disclosure, the stride in the width direction of the convolution kernel used in performing the pixel extraction may be pre-configured according to an algorithm or user requirements. For example, if the stride in the width direction of the convolution kernel used in performing the pixel extraction is 2, then each dedicated processing unit 111 may select every other pixel for the pixel extraction in each row of pixels.

In block 508, the computing device 110 determines, based on a stride in a height direction of the convolution kernel used in performing the pixel extraction, an order of performing the pixel extraction on the plurality of rows of pixels by each of the plurality of dedicated processing units 111.

According to one or more embodiments of the present disclosure, the stride in the height direction of the convolution kernel used in performing the pixel extraction may be pre-configured according to an algorithm or user requirements. For example, if the stride in the height direction of the convolution kernel used in performing the pixel extraction is 2, then each dedicated processing unit 111 may select every other row of pixels for the pixel extraction.

According to one or more embodiments of the present disclosure, the method 500 may not need to include the steps involved in block 504, block 506 and block 508 at the same time, but may include only a part of them, or even may not include the steps involved in block 504, block 506 and block 508.

In block 510, the computing device 110 performs a pixel extraction in parallel on each row of pixels of the plurality of rows of pixels in the input image by using the plurality of dedicated processing units 111, so as to obtain row data for each row of pixels. A specific content of a step involved in block 510 is the same as that involved in block 304, which will not be repeated here.

In block 512, the computing device 110 stitches the row data for each row of pixels obtained in block 304 to obtain an output image. A specific content of a step involved in block 512 is the same as that involved in block 306, which will not be repeated here.

The method 300 of processing the image according to the embodiments of the present disclosure and the method 500 of processing the image according to the embodiments of the present disclosure are described above with reference to FIG. 3 and FIG. 5, respectively. An input data change in a method of processing an image caused by adopting the method 300 of processing the image or the method 500 of processing the image according to the embodiments of the present disclosure will be described below with reference to FIG. 6A to FIG. 6D.

Figure 6A:
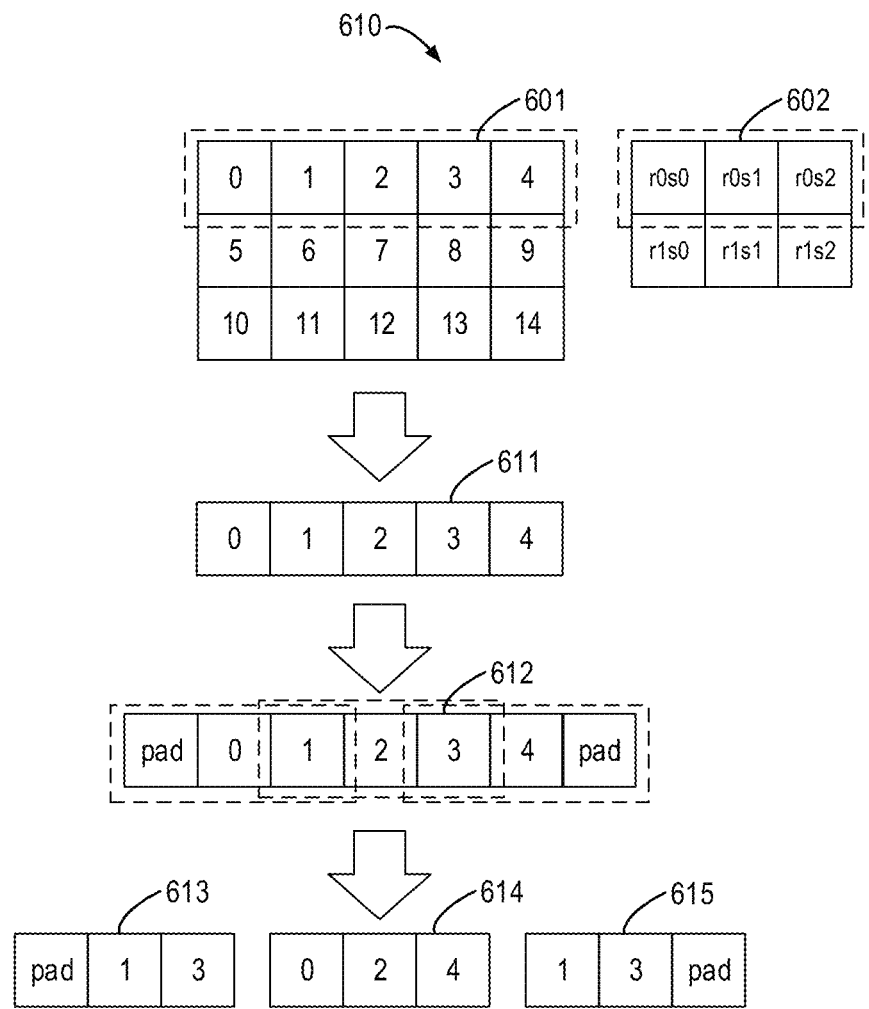
FIG. 6A to FIG. 6D show schematic diagrams of input data changes 610 to 640 in a method of processing an image according to the embodiments of the present disclosure.

FIG. 6A shows a schematic diagram of an input data change 610 in a method of processing an image according to the embodiments of the present disclosure. In the input data change 610 shown in FIG. 6A, a reference numeral 601 represents an input image with a height of 3 columns, a width of 5 rows and a number of channels of 1, and a reference numeral 602 represents a convolution kernel with a height of 2 and a width of 3, which may also be referred to as a filter.

In FIG. 6A to FIG. 6D, an input image with a preset number of channels c=1, an input image height in_h=3, an input image width in_w=5, a convolution kernel height r=2, a convolution kernel width s=3, a stride in a width direction stride_w=2, a stride in a height direction stride_h=1, an upper pad pad_up=0, a lower pad pad_down=0, a left pad pad_left=1 and a right pad pad_right=1 and the number of dedicated processing units being 3 are illustrated by way of example.

In FIG. 6A, a dashed box is added to a first row in input data 601 to indicate that pixels in this row are to be processed, a dashed box is added to a first row in the convolution kernel 602 to indicate that the convolution kernel in this row is to be processed. A reference numeral 611 indicates that data 611 of the first row is extracted from the input data 601. A reference numeral 612 indicates that the computing device 110 adds a pad to the data 611 of the first row extracted from the input data 601 and a division is made. Reference numerals 613, 614 and 615 respectively represent three row data for the data 611 of the first row extracted from the input data 601 processed by three dedicated data processing units, where a block r0s0 in an upper left corner of the convolution kernel is associated with the row data denoted by the reference numeral 613, a block r0s1 in an upper middle of the convolution kernel is associated with the row data denoted by the reference numeral 614, and a block r0s2 in an upper right corner of the convolution kernel is associated with the row data denoted by the reference numeral 615. As described above, the upper pad pad_up and the lower pad pad_down are equal to 0, and the left pad pad_left and the right pad pad_right are equal to 1. Then, as shown by the reference numeral 612, left and right sides of the row are added with a pad of a pixel respectively.

As shown in FIG. 6A, since the pad is added to the left and right sides of the data 611 of the first row extracted from the input data 601 and the stride in the width direction is 2, the three dedicated data processing units respectively process the data 613, 614 and 615 from every other pixel in the padded first row data 612 in the input data 601.

Figure 6B:
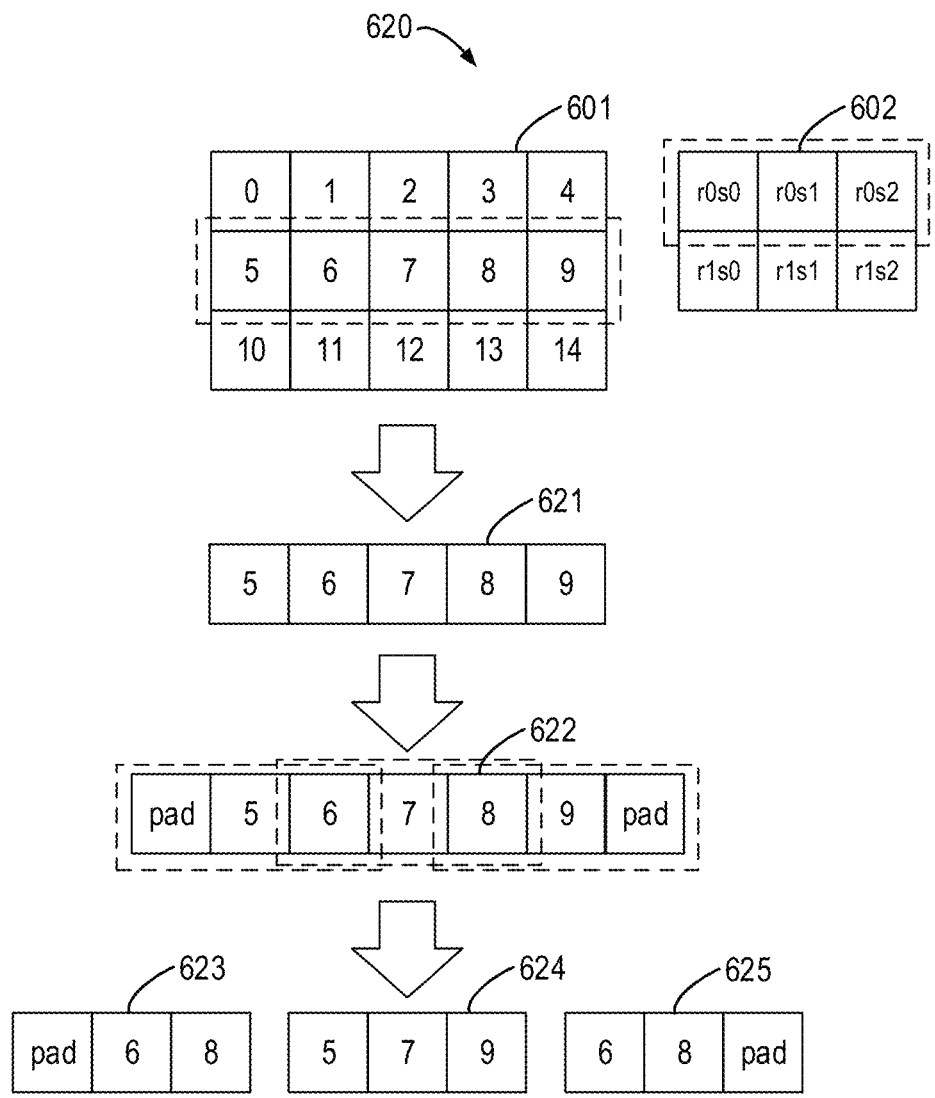

In FIG. 6B, a dashed box is added to a second row in the input data 601 to indicate that pixels in this row are to be processed, a dashed box is added to a first row in the convolution kernel 602 to indicate that the convolution kernel in this row is to be processed. A reference numeral 621 indicates that data 621 of the second row is extracted from the input data 601. A reference numeral 622 indicates that the computing device 110 adds a pad to the data 621 of the second row extracted from the input data 601 and a division is made. Reference numerals 623, 624 and 625 respectively represent three row data for the data 621 of the second row extracted from the input data 601 processed by three dedicated data processing units, where a block r0s0 in an upper left corner of the convolution kernel is associated with the row data denoted by the reference numeral 623, a block r0s1 in an upper middle of the convolution kernel is associated with the row data denoted by the reference numeral 624, and a block r0s2 in an upper right corner of the convolution kernel is associated with the row data denoted by the reference numeral 625.

As shown in FIG. 6B, since the pad is added to the left and right sides of the data 621 of the second row extracted from the input data 601 and the stride in the width direction is 2, the three dedicated data processing units respectively process the data 623, 624 and 625 from every other pixel in the padded first row data 622 in the input data 601.

Figure 6C:
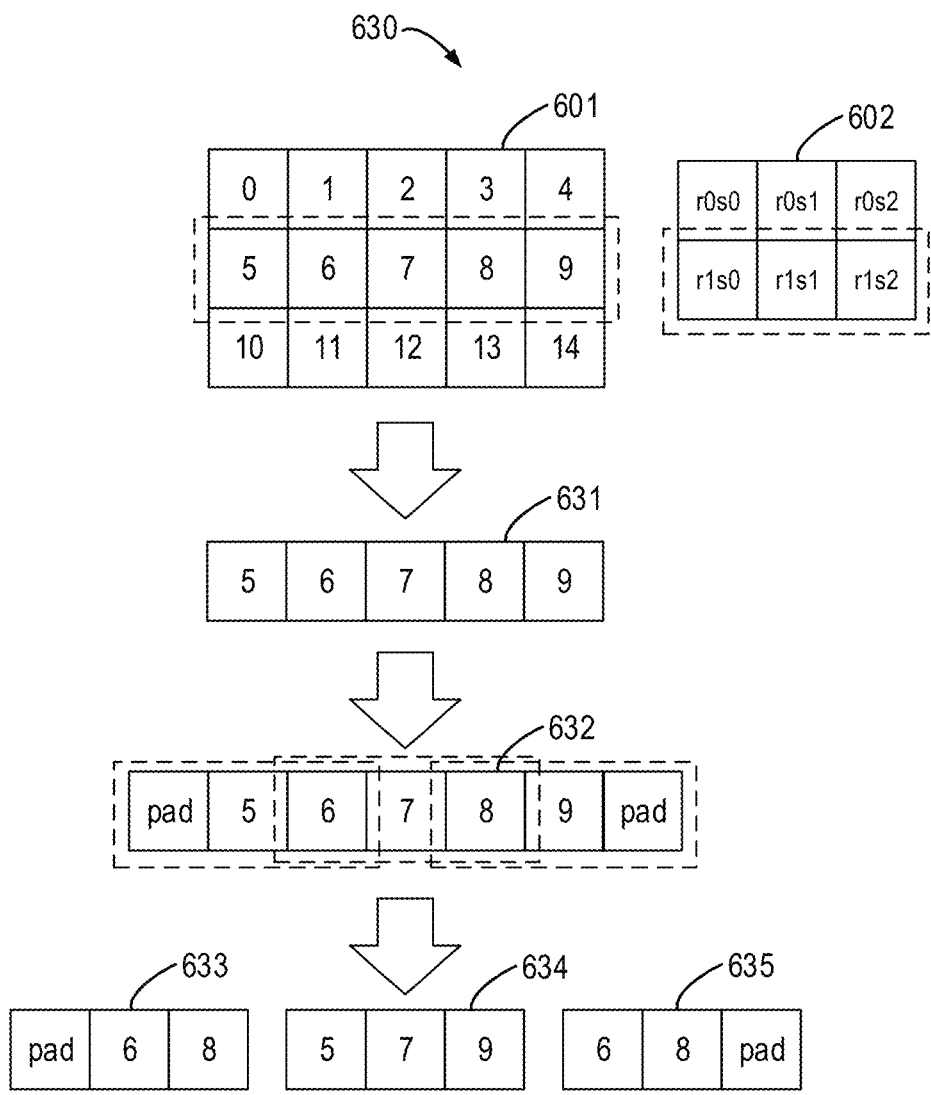

In FIG. 6C, a dashed box is added to a second row in the input data 601 to indicate that pixels in this row are to be processed, a dashed box is added to a second row in the convolution kernel 602 to indicate that the convolution kernel in this row is to be processed. A reference numeral 631 indicates that data 631 of the second row is extracted from the input data 601. A reference numeral 632 indicates that the computing device 110 adds a pad to the data 631 of the second row extracted from the input data 601 and a division is made. Reference numerals 633, 634 and 635 respectively represent three row data for the data 631 of the second row extracted from the input data 601 processed by three dedicated data processing units, where a block r1s0 in a lower left corner of the convolution kernel is associated with the row data denoted by the reference numeral 633, a block r1s1 in a lower middle of the convolution kernel is associated with the row data denoted by the reference numeral 634, and a block r1s2 in a lower right corner of the convolution kernel is associated with the row data denoted by the reference numeral 635.

As shown in FIG. 6C, since the pad is added to the left and right sides of the data 631 of the second row extracted from the input data 601 and the stride in the width direction is 2, the three dedicated data processing units respectively process the data 633, 634 and 635 from every other pixel in the padded first row data 632 in the input data 601.

Figure 6D:
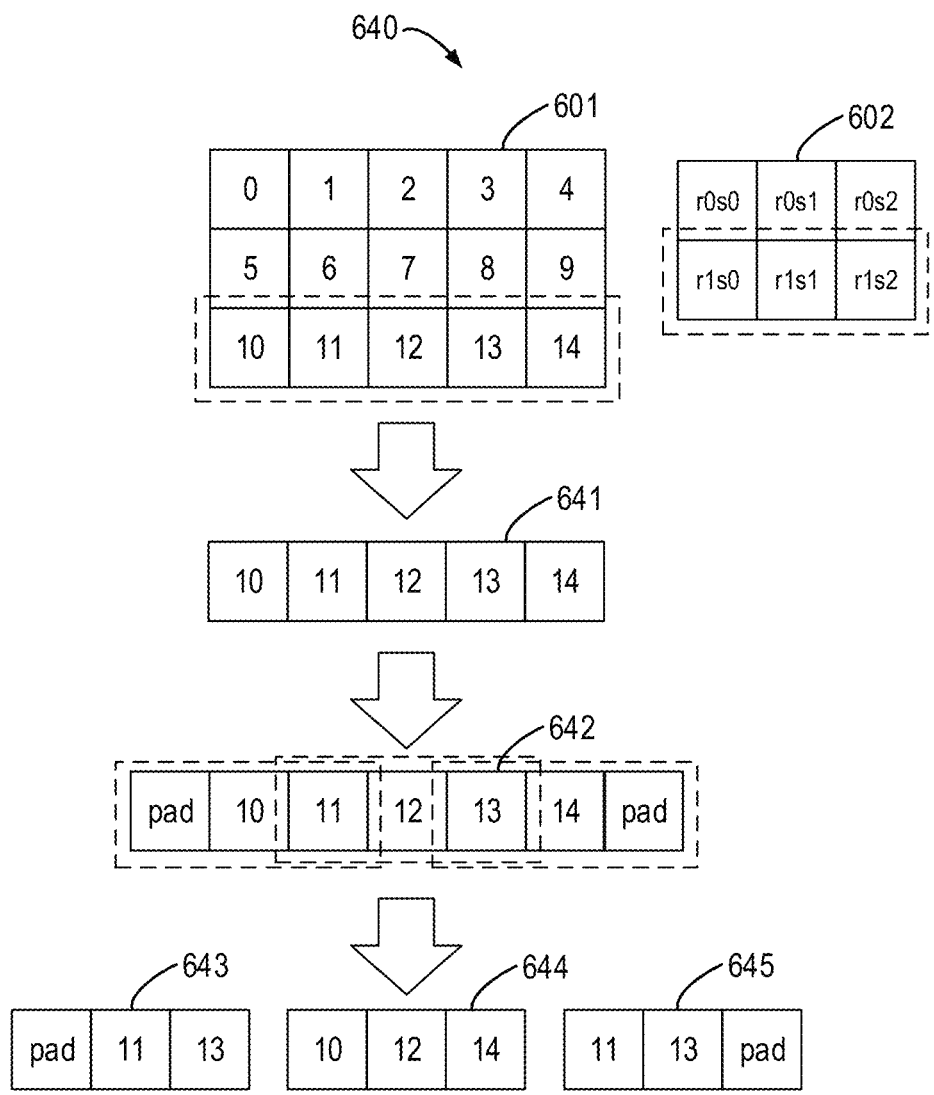

In FIG. 6D, a dashed box is added to a third row in the input data 601 to indicate that pixels in this row are to be processed, a dashed box is added to the second row in the convolution kernel 602 to indicate that the convolution kernel in this row is to be processed. A reference numeral 641 indicates that data 641 of the third row is extracted from the input data 601. A reference numeral 642 indicates that the computing device 110 adds a pad to the data 641 of the third row extracted from the input data 601 and a division is made. Reference numerals 643, 644 and 645 respectively represent three row data for the data 641 of the third row extracted from the input data 601 processed by three dedicated data processing units, where a block r1s0 in a lower left corner of the convolution kernel is associated with the row data denoted by the reference numeral 643, a block r1s1 in a lower middle of the convolution kernel is associated with the row data denoted by the reference numeral 644, and a block r1s2 in a lower right corner of the convolution kernel is associated with the row data denoted by the reference numeral 645.

As shown in FIG. 6D, since the pad is added to the left and right sides of the data 641 of the third row extracted from the input data 601 and the stride in the width direction is 2, the three dedicated data processing units respectively process the data 643, 644 and 645 from every other pixel in the padded first row data 642 in the input data 601.

It should be noted that since in the examples of FIG. 6A to FIG. 6D, the height of the convolution kernel is 2 and the convolution kernel may move on the input image 601 as a whole, in order to avoid the convolution kernel moving beyond a range of the input image 601, the first row of the convolution kernel moves only through the first and second rows of the input data 601, and the second row of the convolution kernel moves only through the second and third rows of the input data 601.

After the row data 613, 614, 615, 623, 624, 625, 633, 634, 635, 643, 644 and 645 are obtained respectively as shown in FIG. 6A to FIG. 6D, they may be stitched to obtain an output matrix, which will be described below with reference to FIG. 7.

Figures 7, 8:
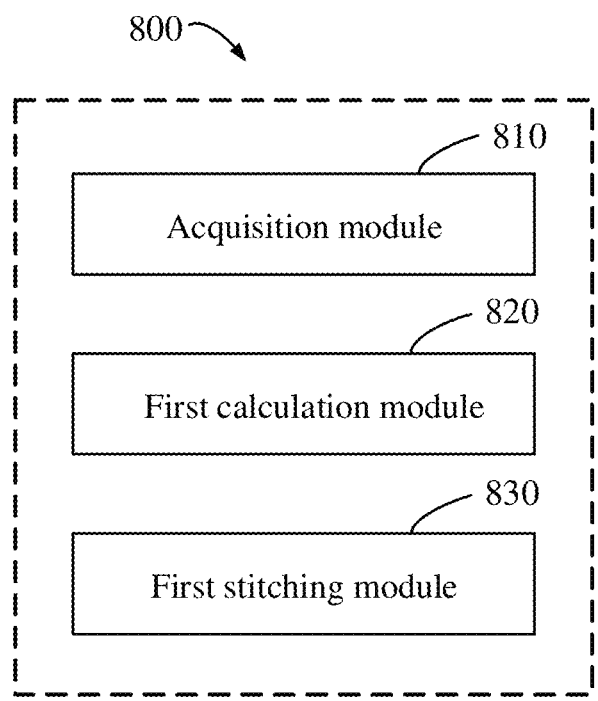
FIG. 7 shows a schematic diagram of an output matrix 700 according to the embodiments of the present disclosure.
FIG. 8 shows a schematic block diagram of an apparatus 800 of processing an image according to the embodiments of the present disclosure.

FIG. 7 shows a schematic diagram of an output matrix 700 according to the embodiments of the present disclosure. In the matrix 700, a first row contains values in the row data 613 and 623 associated with the block r0s0 in the upper left corner of the convolution kernel, a second row contains values in the row data 614 and 624 associated with the block r0s1 in the upper middle of the convolution kernel, a third row contains values in the row data 615 and 625 associated with the block r0s2 in the upper right corner of the convolution kernel, a fourth row contains values in the row data 633 and 643 associated with the block r1s0 in the lower left corner of the convolution kernel, a fifth row contains values in the row data 634 and 644 associated with the block r1s1 in the lower middle of the convolution kernel, and a sixth row contains values in the row data 635 and 645 associated with the block r1s2 in the lower right corner of the convolution kernel. Accordingly, a matrix size of the output matrix 700 is [c*r*s, out_h*out_w]=[6,6], where each row of the output matrix 700 represents the data taken out when a corresponding element of the convolution kernel slides on the image.

It should be understood that in the examples described with reference to FIG. 6A to FIG. 6D and FIG. 7, the block r0s0 in the upper left corner and the block r1s0 in the lower left corner of the convolution kernel are processed by a dedicated processing unit, the block r0s1 in the upper middle and the block r1 s1 in the lower middle of the convolution kernel are processed by another dedicated processing unit, and the block r0s2 in the upper right corner and the block r1s2 in the lower right corner of the convolution kernel are processed by yet another dedicated processing unit. However, a practical application is not limited to this correspondence. Further, for a scene where the number of channels c is greater than 1, the aforementioned operation may be performed on each channel of the input image, and then the output matrix obtained from each channel may be stitched together to obtain an output matrix for the input image with multiple channels. For example, if the number of channels c in the above example is 2, an output matrix with 12 rows and 6 columns may be obtained.

In addition, it should be understood that the stored rows and columns in the above examples are only logical concepts and do not represent an actual location in a memory.

Moreover, according to one or more embodiments of the present disclosure, parallel computing may achieve a highest efficiency when the number of the dedicated processing units is not less than the width of the convolution kernel.

Contents related to the image processing environment 100 in which the method of processing the image in some embodiments of the present disclosure may be implemented, the image processing environment 200 in which the method of processing the image in some embodiments of the present disclosure may be implemented, the method 300 of processing the image according to the embodiments of the present disclosure and the method 500 of processing the image according to the embodiments of the present disclosure are described above with reference to FIG. 1 to FIG. 7. It should be understood that the above description is to better illustrate the contents recorded in the present disclosure and is not intended to limit the present disclosure in any way.

It should be understood that the number of various elements and the size of physical quantities used in the above drawings of the present disclosure are only examples, not restrictions on the scope of protection of the present disclosure. The above number and size may be arbitrarily set as needed without affecting the normal implementation of the embodiments of the present disclosure.

Details of the method 300 of processing the image and the method 500 of processing the image according to the embodiments of the present disclosure have been described above with reference to FIG. 1 to FIG. 7. Hereinafter, modules in an apparatus of processing an image will be described with reference to FIG. 8.

FIG. 8 shows a schematic block diagram of an apparatus 800 of processing an image according to the embodiments of the present disclosure. As shown in FIG. 8, the apparatus 800 of processing the image includes: an acquisition module 810 configured to acquire an input image containing a plurality of rows of pixels; a first calculation module 820 configured to perform, by using a plurality of dedicated processing units, a pixel extraction in parallel on each row of pixels of the plurality of rows of pixels in the input image, so as to obtain row data for each row of pixels; and a first stitching module 830 configured to stitch the row data for each row of pixels, so as to obtain an output image.

In one or more embodiments, the first calculation module 820 includes: a padding module (not shown) configured to pad on an edge of at least one side of the input image, so as to obtain a padded input image; and a second calculation module (not shown) configured to perform, by using the plurality of dedicated processing units, the pixel extraction in parallel on each row of pixels of the plurality of rows of pixels in the padded input image, so as to obtain the row data for each row of pixels.

In one or more embodiments, the first calculation module 820 includes a pixel-number determination module (not shown) configured to determine, based on a width of a convolution kernel used in performing the pixel extraction, a number of pixels being extracted each time the pixel extraction is performed on each row of pixels by each of the plurality of dedicated processing units.

In one or more embodiments, the first calculation module includes a pixel determination module (not shown) configured to determine, based on a stride in a width direction of a convolution kernel used in performing the pixel extraction, a pixel being extracted each time the pixel extraction is performed on each row of pixels by each of the plurality of dedicated processing units.

In one or more embodiments, the first calculation module includes an order determination module (not shown) configured to determine, based on a stride in a height direction of a convolution kernel used in performing the pixel extraction, an order of performing the pixel extraction on the plurality of rows of pixels by each of the plurality of dedicated processing units.

In one or more embodiments, the input image contains at least one channel, and each of the at least one channel includes a plurality of rows of pixels. The first calculation module 820 includes: a third calculation module (not shown) configured to perform, by using the plurality of dedicated processing units, the pixel extraction in parallel on each row of pixels of the plurality of rows of pixels in each channel of the input image, so as to obtain row processing data for each row of pixels in the channel. The first stitching module 830 includes: a second stitching module (not shown) configured to stitch the row processing data for each row of pixels in the channel, so as to obtain channel data for the channel; and a third stitching module (not shown) configured to stitch the channel data for each channel, so as to obtain the output image.

Through the above description with reference to FIG. 1 to FIG. 8, the technical solution according to the embodiments of the present disclosure has a plurality of advantages over the solution. For example, with the technical solution according to the embodiments of the present disclosure, a format processing of input images in various sizes may be flexibly supported and a pixel extraction may be performed efficiently by taking full advantage of parallelism of hardware, so that an efficient weight gradient calculation may be supported, a throughput of an overall computing process may be improved, and thus a user experience may be improved.

Specifically, with the technical solution according to the embodiments of the present disclosure, the parameter may be flexibly configured according to the received parameter configuration instruction to adapt to a variety of input image sizes and convolution kernel sizes. Furthermore, because a plurality of dedicated processing units operate in parallel and each dedicated processing unit may acquire a plurality of data at the same time and stitch the data, an input data processing work may be performed efficiently on the whole. In addition, because the technical solution according to the embodiments of the present disclosure is equivalent to completing im2col operation and transpose operation at the same time, it is not needed to occupy an additional storage space.

According to the embodiments of the present disclosure, the present disclosure further provides an electronic device, a computer-readable storage medium and a computer program product.

Figure 9:
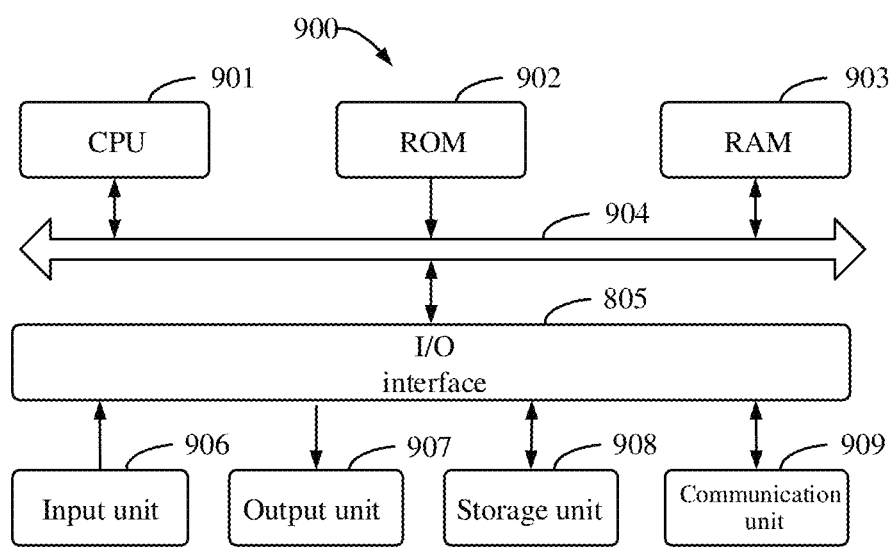
FIG. 9 shows a schematic block diagram of an exemplary electronic device 900 for implementing the embodiments of the present disclosure.

FIG. 9 shows a schematic block diagram of an exemplary electronic device 900 for implementing the embodiments of the present disclosure. For example, the computing device 110 shown in FIG. 1, the computing device 210 shown in FIG. 2 and the apparatus 800 of processing the image shown in FIG. 8 may be implemented by the electronic device 900. The electronic device 900 is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 9, the electronic device 900 may include a computing unit 901, which may perform various appropriate actions and processing based on a computer program stored in a read-only memory (ROM) 902 or a computer program loaded from a storage unit 908 into a random access memory (RAM) 903. Various programs and data required for the operation of the electronic device 900 may be stored in the RAM 903. The computing unit 901, the ROM 902 and the RAM 903 are connected to each other through a bus 904. An input/output (I/O) interface 905 is further connected to the bus 904.

Various components in the electronic device 900, including an input unit 906 such as a keyboard, a mouse, etc., an output unit 907 such as various types of displays, speakers, etc., a storage unit 908 such as a magnetic disk, an optical disk, etc., and a communication unit 909 such as a network card, a modem, a wireless communication transceiver, etc., are connected to the I/O interface 905. The communication unit 909 allows the electronic device 900 to exchange information/data with other devices through a computer network such as the Internet and/or various telecommunication networks.

The computing unit 901 may be various general-purpose and/or special-purpose processing components with processing and computing capabilities. Some examples of the computing unit 901 include but are not limited to a central processing unit (CPU), a graphics processing unit (GPU), various dedicated artificial intelligence (AI) computing chips, various computing units running machine learning model algorithms, a digital signal processor (DSP), and any appropriate processor, controller, microcontroller, and so on. The computing unit 901 may perform the various methods and processes described above, such as the methods 300 and 500. For example, in some embodiments, the methods 300 and 500 may be implemented as a computer software program that is tangibly contained on a machine-readable medium, such as the storage unit 908. In some embodiments, part or all of a computer program may be loaded and/or installed on the electronic device 900 via the ROM 902 and/or the communication unit 909. When the computer program is loaded into the RAM 903 and executed by the computing unit 901, one or more steps of the methods 300 and 500 described above may be performed. Alternatively, in other embodiments, the computing unit 901 may be configured to perform the methods 300 and 500 in any other appropriate way (for example, by means of firmware).

Various embodiments of the systems and technologies described herein may be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from the storage system, the at least one input device and the at least one output device, and may transmit the data and instructions to the storage system, the at least one input device, and the at least one output device.

Program codes for implementing the method of the present disclosure may be written in any combination of one or more programming languages. These program codes may be provided to a processor or a controller of a general-purpose computer, a special-purpose computer, or other programmable data processing devices, so that when the program codes are executed by the processor or the controller, the functions/operations specified in the flowchart and/or block diagram may be implemented. The program codes may be executed completely on the machine, partly on the machine, partly on the machine and partly on the remote machine as an independent software package, or completely on the remote machine or the server.

In the context of the present disclosure, the machine readable medium may be a tangible medium that may contain or store programs for use by or in combination with an instruction execution system, device or apparatus. The machine readable medium may be a machine-readable signal medium or a machine-readable storage medium. The machine readable medium may include, but not be limited to, electronic, magnetic, optical, electromagnetic, infrared or semiconductor systems, devices or apparatuses, or any suitable combination of the above. More specific examples of the machine readable storage medium may include electrical connections based on one or more wires, portable computer disks, hard disks, random access memory (RAM), read-only memory (ROM), erasable programmable read-only memory (EPROM or flash memory), optical fiber, convenient compact disk read-only memory (CD-ROM), optical storage device, magnetic storage device, or any suitable combination of the above.

In order to provide interaction with users, the systems and techniques described here may be implemented on a computer including a display device (for example, a CRT (cathode ray tube) or LCD (liquid crystal display) monitor) for displaying information to the user), and a keyboard and a pointing device (for example, a mouse or a trackball) through which the user may provide the input to the computer. Other types of devices may also be used to provide interaction with users. For example, a feedback provided to the user may be any form of sensory feedback (for example, visual feedback, auditory feedback, or tactile feedback), and the input from the user may be received in any form (including acoustic input, voice input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and Internet.

The computer system may include a client and a server. The client and the server are generally far away from each other and usually interact through a communication network. The relationship between the client and the server is generated through computer programs running on the corresponding computers and having a client-server relationship with each other.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. A method of processing an image, comprising:
acquiring an input image containing a plurality of rows of pixels;
performing, by using a plurality of dedicated processing units, a pixel extraction in parallel on each row of pixels of the plurality of rows of pixels in the input image, obtaining row data for each row of pixels; and
stitching the row data for each row of pixels, obtaining an output image, wherein
the input image contains at least one channel, and each of the at least one channel comprises a plurality of rows of pixels;
the performing a pixel extraction in parallel comprises:
padding on an edge of at least one side of the input image, obtaining a padded input image; and
performing, by using the plurality of dedicated processing units, the pixel extraction in parallel on each row of pixels of the plurality of rows of pixels in each channel of the padded input image, obtaining row processing data for each row of pixels in the channel; and
the stitching row data for each row of pixels comprises:
stitching the row processing data for each row of pixels in the channel, obtaining channel data for the channel; and
stitching the channel data for each channel, obtaining the output image.

2. The method of claim 1, wherein the performing a pixel extraction in parallel further comprises:
determining, based on a width of a convolution kernel used in performing the pixel extraction, a number of pixels being extracted each time the pixel extraction is performed on each row of pixels by each of the plurality of dedicated processing units.

3. The method of claim 1, wherein the performing a pixel extraction in parallel further comprises:
determining, based on a stride in a width direction of a convolution kernel used in performing the pixel extraction, a pixel being extracted each time the pixel extraction is performed on each row of pixels by each of the plurality of dedicated processing units.

4. The method of claim 1, wherein the performing a pixel extraction in parallel further comprises:
determining, based on a stride in a height direction of a convolution kernel used in performing the pixel extraction, an order of performing the pixel extraction on the plurality of rows of pixels by each of the plurality of dedicated processing units.

5. An electronic device, comprising:
at least one processor; and
a memory communicatively connected to the at least one processor, wherein the memory stores instructions executable by the at least one processor, and the instructions, when executed by the at least one processor, cause the at least one processor to implement operations of processing an image, comprising:
acquiring an input image containing a plurality of rows of pixels;
performing, by using a plurality of dedicated processing units, a pixel extraction in parallel on each row of pixels of the plurality of rows of pixels in the input image, obtaining row data for each row of pixels; and
stitching the row data for each row of pixels, obtaining an output image, wherein
the input image contains at least one channel, and each of the at least one channel comprises a plurality of rows of pixels;
the performing a pixel extraction in parallel comprises:
padding on an edge of at least one side of the input image, obtaining a padded input image; and
performing, by using the plurality of dedicated processing units, the pixel extraction in parallel on each row of pixels of the plurality of rows of pixels in each channel of the padded input image, obtaining row processing data for each row of pixels in the channel; and
the stitching row data for each row of pixels comprises:
stitching the row processing data for each row of pixels in the channel, obtaining channel data for the channel; and
stitching the channel data for each channel, obtaining the output image.

6. The electronic device of claim 5, wherein the instructions, when executed by the at least one processor, cause the at least one processor further to implement operation of:
determining, based on a width of a convolution kernel used in performing the pixel extraction, a number of pixels being extracted each time the pixel extraction is performed on each row of pixels by each of the plurality of dedicated processing units.

7. The electronic device of claim 5, wherein the instructions, when executed by the at least one processor, cause the at least one processor further to implement operation of:
determining, based on a stride in a width direction of a convolution kernel used in performing the pixel extraction, a pixel being extracted each time the pixel extraction is performed on each row of pixels by each of the plurality of dedicated processing units.

8. The electronic device of claim 5, wherein the instructions, when executed by the at least one processor, cause the at least one processor further to implement operation of:
determining, based on a stride in a height direction of a convolution kernel used in performing the pixel extraction, an order of performing the pixel extraction on the plurality of rows of pixels by each of the plurality of dedicated processing units.

9. A non-transitory computer-readable storage medium having computer instructions stored thereon, wherein the computer instructions allow a computer to implement operations of processing an image, comprising:
acquiring an input image containing a plurality of rows of pixels;

performing, by using a plurality of dedicated processing units, a pixel extraction in parallel on each row of pixels of the plurality of rows of pixels in the input image, obtaining row data for each row of pixels; and stitching the row data for each row of pixels, obtaining an output image, wherein the input image contains at least one channel, and each of the at least one channel comprises a plurality of rows of pixels;

the performing a pixel extraction in parallel comprises:
  padding on an edge of at least one side of the input image, obtaining a padded input image; and
  performing, by using the plurality of dedicated processing units, the pixel extraction in parallel on each row of pixels of the plurality of rows of pixels in each channel of the padded input image, obtaining row processing data for each row of pixels in the channel; and the stitching row data for each row of pixels comprises:
  stitching the row processing data for each row of pixels in the channel, obtaining channel data for the channel; and stitching the channel data for each channel, obtaining the output image.

10. The storage medium of claim 9, wherein the computer instructions allow the computer further to implement operation of:
  determining, based on a width of a convolution kernel used in performing the pixel extraction, a number of pixels being extracted each time the pixel extraction is performed on each row of pixels by each of the plurality of dedicated processing units.

11. The storage medium of claim 9, wherein the computer instructions allow the computer further to implement operation of:
  determining, based on a stride in a width direction of a convolution kernel used in performing the pixel extraction, a pixel being extracted each time the pixel extraction is performed on each row of pixels by each of the plurality of dedicated processing units.

12. The storage medium of claim 9, wherein the computer instructions allow the computer further to implement operation of:
  determining, based on a stride in a height direction of a convolution kernel used in performing the pixel extraction, an order of performing the pixel extraction on the plurality of rows of pixels by each of the plurality of dedicated processing units.

* * * * *